INVENTOR

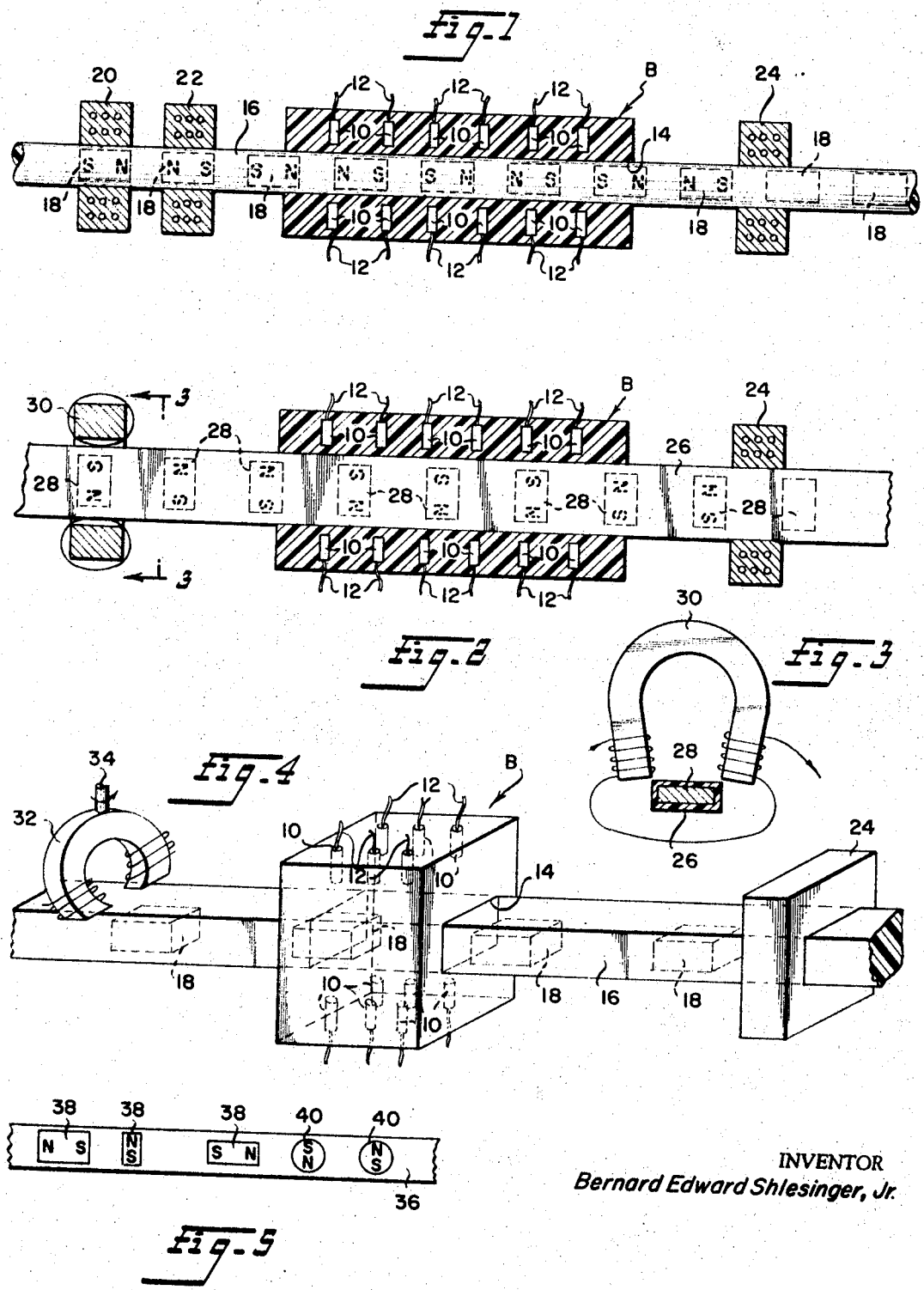

Bernard Edward Shlesinger, Jr.

INVENTOR
Bernard Edward Shlesinger, Jr.

United States Patent Office 3,447,105
Patented May 27, 1969

3,447,105
POLARIZED MAGNETIC CABLE SWITCH PROGRAMMING SYSTEM AND APPARATUS
Bernard Edward Shlesinger, Jr., 906 Bruce Lane, Annandale, Va. 22003
Filed Sept. 21, 1967, Ser. No. 669,614
Int. Cl. H01h 51/22
U.S. Cl. 335—79                                      30 Claims

ABSTRACT OF THE DISCLOSURE

A magnetic programming system comprising an electrical component support block, a nonmagnetic carrier supported by the block and movable with respect thereto, means for moving the carrier, the block including magnetic field responsive sensing means, the carrier including support means specifically positioned with respect thereto, magnetic field responsive transmitting means carried by support means, means for selectively inducing in the transmitting means one of at least two directionally different polarities, the sensing means directionally oriented to operate in a specific manner only one of the polarities when the transmitting means is moved into a position detectable by the sensing means so as to thus operate a circuit.

---

This invention pertains to a polarized magnetic cable switch programming system of a type similar to any U.S. Patent No. 3,261,941, issued July 19, 1966, and also relates to my copending application Ser. No. 533,017, filed Mar. 9 1966.

OBJECTS AND SUMMARY

The prior developments in the field of magnetic programming systems have attempted to utilize a number of variables so as to give flexibility to the system. As in the case of my U.S. Patent No. 3,261,941, the carrier which supported the magnetic members, could be changed and the magnets in the carrier having a polarity in one direction removed and replaced by magnets having a polarity in the reverse direction. The present system allows for substantially greater flexibility without having to change the carriers or remove the magnetic members therefrom. It is therefore an object of this invention to provide a much more simple system.

Yet another object of this invention is to provide a programming system which is simple to operate and maintain.

Another object of this invention is to provide a programming system in which the magnetic members can be polarized in any one of many directions for selective operation of switching means or the like reactive to a certain directional polarization.

Still another object of this invention is to provide a programming system which requires a single remote operator for operating a large number of circuits.

Still a further object of this invention is to provide a switch arrangement which eliminates arcing in areas where explosive gases and the like are present.

A further object of this invention is to provide a switching system which permits interchangeability of the programmed members.

A still further object of this invention is to provide a switching system which permits adjustability of the progamming members in order to provide flexibility for timed sequences.

Still another object of this invention is to provide a programming system which allows for multioperation of various subcombinations and banks or units of switches selectively or simultaneously.

A further object of this invention is to provide a programming system which allows for repeat of certain programs or a reversal of the order of the programs.

In summary, this invention is directed to a programming system which provides greater selectivity, ease in manipulation, and low cost operation with high flexibility due to the incident number of combinations available by polarizing in a directional manner.

These and other objects of this invention will be apparent from the following description and claims.

In the accompanying drawings which illustrate by way of example various embodiments of this invention:

FIGURE 1 is a cross-sectional view illustrating the system utilizing two side-by-side encircling electromagnets;

FIGURE 2 is a cross-sectional view illustrating the system utilizing a single electromagnet;

FIGURE 3 is a sectional view taken along the lines 3—3 of FIGURE 2 and viewed in the direction of the arrows;

FIGURE 4 is a perspective view illustrating yet another system embodiment of the invention;

FIGURE 5 is a plan view illustrating a carrier or cable having various magnetic material elements set therein;

FIGURE 1

Figure 6:
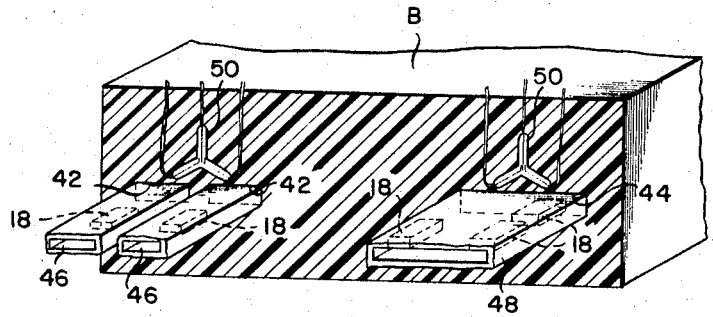
FIGURE 6 is a fragmentary cross-sectional view of a block illustrating still another embodiment of the invention.

FIGURE 1 shows a block B having a series of magnetically operated switch members 10 mounted in the block B. The switch members 10 may be reed switches or other magnetic field sensitive devices. The switches 10 may be potted or set in recesses in the block B and are provided with leads 12 which connect electrical components not shown.

The block B is provided with a passageway or channel 14 for receding a carrier member 16. Any nonconductive belt, strip, web or tape member may be utilized and such terms are to be considered synonymous with the term carrier.

The carrier 16 which is of nonmagnetic material supports a series of magnetic field responsive transmitting means 18. The transmitting means may be of any configuration or shape and generally comprise a magnetic or paramagnetic type material capable of being magnetized. A pair of electromagnets 20 and 22 in the form of magnetic coils surround the carrier 16. The magnets 20 and 22 are wound in opposite directions and connected to a power source (not shown) which permits an operator to selectively choose one or the other of the magnets for inducing a specific directional polarity on the magnetic field responsive transmitting means or slugs or members 18.

On the other side of the block B from the electromagnets 20 and 22, is provided a wiping magnet 24 which can be an electromagnet connected to AC circuit. The carrier 16 may be a continuous web or endless belt or may extend from one reel to another as desired. The carrier may comprise a rod or the like.

As illustrated, the transmitting means or slugs 18 have their longitudinal axis coincident with the longitudinal axis of the carrier 16. The induced polar fields set up on the slugs 18 are indicated in FIGURE 1. It is to be noted that the polarities may run in the same direction or in the reverse direction as illustrated for purposes of operating switches 10 in a selected manner as desired.

Let us for purposes of example assume that the reed switch has it lower contact member polarized as a south pole. If approached by a magnitized transmitting means 18, it will remain in an open position due to the repelling affect of like poles; however, the north pole of the transmitting member 18 now approaches the lower end of the reed swtch, it will cause it to close and remain closed after the member 18 has passed. If however the member 18 is polarized in the reverse direction, the switch will close first due to the attraction of dissimilar poles and after the north pole of the member 18 has passed, will open when the south pole takes affect due to the repelling forces. Various switches similar to the type of switch illustrated in the Germantown Patent No. 3,320,562, issued May 16, 1967. It will now be obvious that by proper programming of the electromagnets 20 and 22, the members 18 will be polarized in specific directions for performing specific operations on the switches 10. Once the members 18 have passed through the block B, the directional polarization can be erased and the members returned by the belt 16 for repolarization if required.

FIGURE 2

In FIGURE 2 the block B is provided with switches 10 in a manner similar to that illustrated in FIGURE 1. The carrier 26 is provided with a series of magnetizable slugs 28 which are set so that their longitudinal axes are transverse to the longitudinal axis of the carrier 26. An electromagnet 30 best shown in FIGURE 3 is set so that the carrier 26 passes adjacent to the legs of the electromagnet 30. The electromagnet 30 is connected to a source of power (not shown) which has means for reversing the current flow in the electromagnet. Thus, when the flow is in one direction, an induced magnetic field will be made in a specified direction in the slugs 28. If the current flow in the electromagnet 30 is reversed, then the slugs are magnetized in a reverse direction as illustrated in FIGURE 2. The operation is generally similar to the operation in FIGURE 1 and a wiping or erasing magnet 24 is provided.

FIGURE 4

In FIGURE 4, the system is similar to the system illustrated in FIGURE 1 with the exception that the electromagnet 32 is supported on a shaft 34 which is connected to a drive means (not shown) for purposes of rotating the electromagnet 32. In this arrangement, the members 18 may be polarized in any direction through an arc of 360°. Such an arrangement permits greater flexibility of the unit and permits the switch members 10 to be set at various angles for specific response to the magnetic fields induced in the slugs or transmitting means 18.

FIGURE 5

In FIGURE 5, a carrier 36 is provided with different types of magnetizable members such as the rectangular members 38 and the circular members 40.

Figure 7:
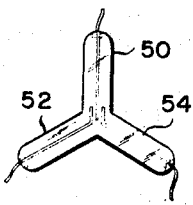
FIGURE 7 is an enlarged cross-sectional view illustrating a type of reed switch as utilized in FIGURE 6.

FIGURES 6 and 7

In FIGURES 6 and 7, the switch block is shown with passageways 42 and 44 which receive carriers 46 and 48. Reed switches 50 are provided with branches 52 and 54. The branches 52 and 54 are so designated as to operate on two different carriers 46 as illustrated in FIGURE 6 or a single carrier 48 having two parallel series of slugs or transmitting members 18.

FIGURE 8

Figure 8:
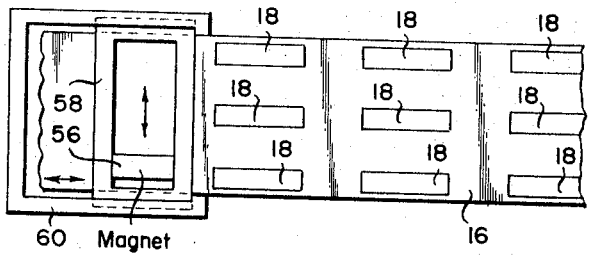
FIGURE 8 is a fragmentary plan view illustrating a field inducing magnet capable of being shifted sideways and lengthwise.

In FIGURE 8, a magnet 56 which may be a regular permanent magnet or an electromagnet is mounted above the carrier 16 which supports magnetic field responsive transmitting members 18. The inducing magnet 56 is mounted on a guide frame 58 for transverse movement relative to the longitudinal axis of the carrier 16. The guide frame 58 is mounted in a second guide frame which is stationary. The magnet 56 can thus be shifted forward or rearward in the frame 60 to permit greater flexibility in producing induced fields in selective slugs or portions of slugs 18. The slugs 18 may be entirely of a magnetic material or may be portions thereof as desired for different combinations of programming arrangements.

FIGURES 9 THROUGH 12

Figure 9:
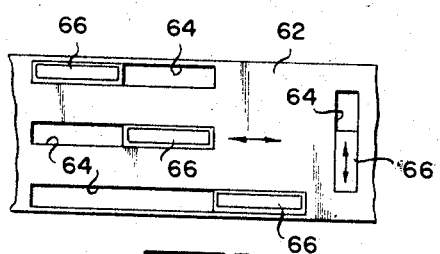
FIGURE 9 illustrates an embodiment of the carrier showing means for shifting the magnetic responsive means transversely and lengthwise of the carrier support.

In FIGURE 9, the carrier 62 is provided with slots 64 for receipt of magnetic field responsive transmitting members 66. The members 66 are shiftable in the slots 64 either transversely or longitudinally as illustrated.

Figure 10:
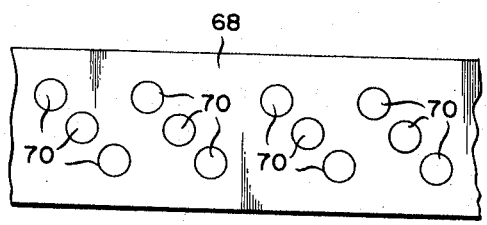
FIGURE 10 illustrates a carrier having magnetizable elements arranged in a predetermined order in staggered series.

In FIGURE 10, the carrier 68 is provided with a series of slugs of magnetic material 70 which are set in a step fashion for signaling purposes as will be hereinafter discussed.

Figure 11:
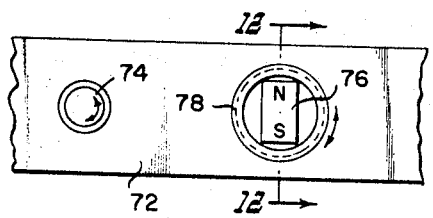
FIGURE 11 is still another embodiment of the carrier showing magnetizable elements rotatably positioned within the carrier.
Figure 12:
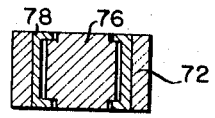
FIGURE 12 is a cross-sectional view taken along the lines 12—12 in FIGURE 11 and viewed in the direction of the arrows.

In FIGURE 11, the carrier 72 is provided with rotatable magnetizable slugs 74 and 76. The slug 76 as best illustrated in FIGURE 12 is set in a bearing sleeve 78 and rotates therein. It is thus obvious that the directional polarity of the slugs may be changed subsequent to the inducing of the polarity. This also permits greater flexibility of the system since it allows for changeability of the directional field even after polarization.

FIGURES 13 THROUGH 16

Figure 13:
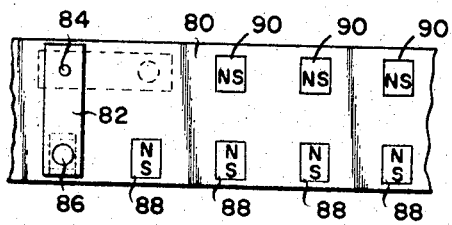
FIGURES 13 and 14 illustrate further embodiments of the invention showing pivoting magnetic devices for inducing polarities in various members supported by the carriers.

FIGURE 13 shows a carrier 80 passing beneath a magnetic field inducing member 82. The member 82 is mounted on a pivot 84 which permits the electromagnet or magnet 86 to be swung across the carrier 80 from one position to another. Note the solid line position as inducing magnetic fields on the slugs 88 and the dotted line position as inducing magnetic fields on the slugs 90. Note that the field on the slugs 90 run in a longitudinal fashion whereas the field on the slugs 88 run in a transverse fashion.

Figure 14:
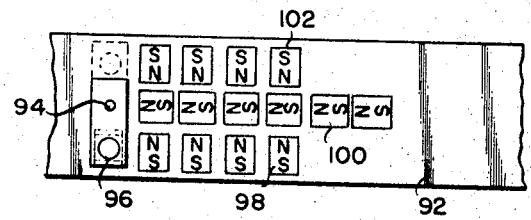

In FIGURE 14, the carrier 92 travels beneath a pivoting support 94 carrying an electromagnet 96 or the like. Three parallel lines of magnetizable plugs are mounted in the carrier 92. It is obvious that pivoting of the support 94 will move the electromagnet 96 into position relative to one of the series of plugs or magnetizable slugs 98, 100 or 102. It will be noted that the direction of polarization is changed as illustrated in FIGURE 14.

Figure 15:
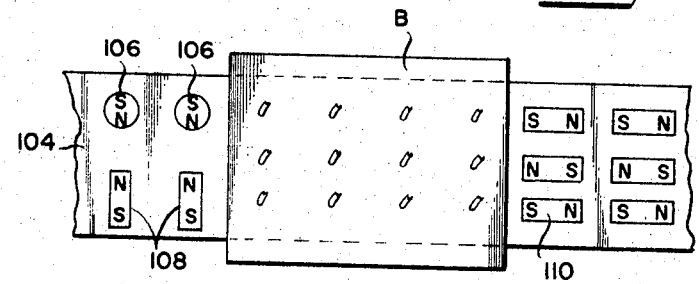
FIGURE 15 shows yet another embodiment of the invention in plan view illustrating the block and the carrier with the carrier having magnetic transmitting units set in various groupings.

FIGURE 15 illustrates a block B having a carrier 104 with a variable series of magnetizable members such as circular members 106, rectangular members 108 extending in an transverse direction and rectangular members 110 extending in a longitudinal direction. This arrangement can be utilized in the general arrangement illustrated in FIGURE 14 for various selective programming arrangements.

Figure 16:
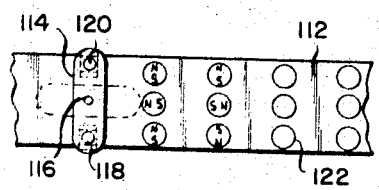
FIGURE 16 illustrates yet a further embodiment of the invention in which the magnet inducing means is pivotable about its central axis.

FIGURE 16 shows the carrier 112 passing beneath a rotatable magnetic support member 114 mounted on a pivot 116 and having a pair of electromagnets 118 and 120 or the like. The direction of polarity of the electromagnets is the same and since they are on opposite sides of the pivot 116, a change of 180° of the magnet support, will reverse the position of polarity desired in the various slugs 122. By moving the carrier 112 in increments, various combinations and directional polarities can be made up on the slugs 122 as desired for movement into a switch block similar to that heretofore described.

FIGURES 17 THROUGH 21

Figure 17:
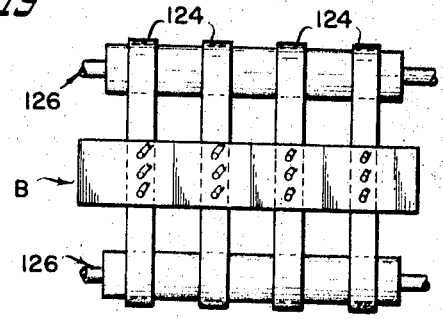
FIGURE 17 illustrates yet another embodiment in plan view showing a plurality of carriers operated in a plurality of openings in a switch block.
Figure 18:
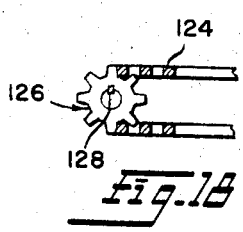
FIGURE 18 is a fragmentary cross-sectional view illustrating a drive system for the carriers.
Figure 19:
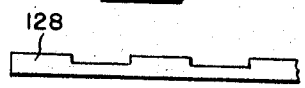
FIGURE 19 shows a key member for insertion into the cog drive wheel of FIGURE 18 for permitting engaging and disengaging of certain carrier members.

FIGURE 17 shows a block B with a series of belts 124 mounted on a pair of shafts 126 for movement through the block B. Certain portions of the shafts can be disengaged for handling of certain belts 124. A cog arrangement for driving the belts 124 is best illustrated in FIGURE 18. The shafts 126 are keyed by keys 128 best illustrated in FIGURE 19. By selecting certain keys for insertion into the shafts 126, certain of the belts 124 will be idle while others will be driven. Other types of drive arrangements can be made for clutching in and clutching out as desired. In FIGURE 17 the belts are spaced from each other.

Figure 21:
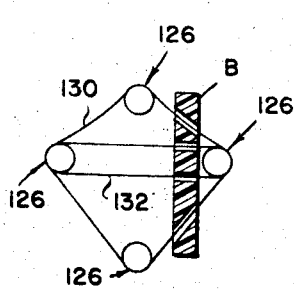
FIGURE 21 illustrates yet a further embodiment of the invention in which the carriers are of different lengths and fall in different plains.

FIGURE 21 shows a block B having a series of belts 130 and 132. Belt 130 is longer than belt 132 and extends in different planes than in belt 132. This allows for additional variables in the programming and positioning of the magnetizable slugs heretofore described. Various other belting arrangements can be worked out.

Figure 20:
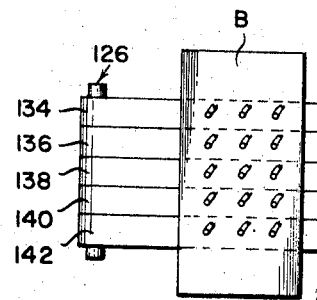
FIGURE 20 is yet a further embodiment of the invention illustrating in plan view a series of carriers extending through a switch block and the carriers all being in side-by-side abutting relationship.

FIGURE 20 illustrates a block B and a series of carriers 134, 136, 138, 140 and 142 arranged in abutting relationship. This particular arrangement allows for greater flexibility in that a continuous belt or carrier can be now made up into a series of adjacent carriers in order to change certain portions thereof by deletion or shifting position to permit additional arrangements in programming.

USEFUL PURPOSES

It will now be obvious that many useful purposes can be utilized for the arrangements as illustrated in the drawings. FIGURE 13 for example could be used for purposes of alrams wherein the carrier 80 will be continuously moving and the magnetized members 88 continuously operating a certain circuit to indicate a steady condition. If however the magnet 86 is pivoted so as to operate on the magnetizable elements 90 and not on the magetizable elements 88, a different signal will be set up thus indicating for example a dangerous condition. Such devices as illustrated can be used in all types of measuring instruments such as weather instruments for determining the velocities of wind, or temperature, or barometric readings or the like. The arrangement of the slugs 70 as for example in FIGURE 10 would permit certain sequential opertaion particularly if the belt is timed to proceed at selected intervals.

While the invention has been described, it will be understood that it is capable of further modifications and this application is intended to cover any variations, uses, or adaptations of the invention following in general, the principles of the invention and including such departures from the present disclosure as come within the known or customary practice in the art to which the invention pertains, and as may be applied to the essential features hereinbefore set forth and as fall within the scope of the invention or the limits of the appended claims.

I claim:
1. A magnetic programming system comprising:
   (a) an electrical component support block;
   (b) a nonmagnetic linear elongated carrier in close proximity to said block and movable with respect thereto;
   (c) means for moving said carrier;
   (d) said block including a plurality of sequentially spaced in-line magnetic field responsive sensing means positioned along the longitudinal axis of said carrier;
   (e) said carrier including a plurality of longitudinally spaced support means specifically positioned with respect thereto;
   (f) a plurality of longitudinally spaced magnetic field responsive transmitting means carried by said support means;
   (g) means positioned along the longitudinal axis of said carrier for selectively inducing in said transmitting means one of at least two directionally different polarities;
   (h) said sensing means directionally oriented magnetically to operably respond to one only of said at least two directionally different polarities when said transmitting means is moved into a position detectable by said sensing means to thus operate a circuit.

2. A magnetic programming system as in claim 1 and wherein:
   (a) said magnetizable elements are in staggered relationship relative to each other along the longitudinal axis of said carrier.

3. A magnetic programming system as in claim 1 and wherein:
   (a) said transmitting means are arranged in parallel rows on said carrier.

4. A magnetic programming system as in claim 1 and wherein:
   (a) certain of said magnetizable elements are of a different size from certain others.

5. A magnetic programming system as in claim 1 and wherein:
   (a) said means for inducing polarities is rotatable.

6. A magnetic programming system as in claim 1 and wherein:
   (a) said means for inducing polarities is oscillatable.

7. A magnetic programming system as in claim 1 and wherein:
   (a) said means for inducing polarities is axially aligned with said carrier and encircles said carrier.

8. A magnetic programming system as in claim 1 and wherein:
   (a) said means for inducing polarities includes a plurality of magnets.

9. A magnetic programming system as in claim 1 and wherein:
   (a) said means for inducing polarities includes a magnet having its polar axis at an angle to the axis of said carrier.

10. A magnetic programming system as in claim 1 and wherein:
    (a) said carrier lies substantially between the poles of said means for producing polarities.

11. A magnetic programming system as in claim 1 and wherein:
    (a) said transmitting means includes a plurality of elements having their axis aligned with the axes of said carrier.

12. A magnetic programming system as in claim 1 and wherein:
  (a) said transmitting means includes a plurality of elements having their axis transverse to the longitudinal axis of said carrier.

13. A magnetic programming system as in claim 1 and wherein:
  (a) said carrier includes means for permitting rotation of said magnetic field responsive transmitting means.

14. A magnetic programming system as in claim 13 and wherein:
  (a) said means for permitting rotation of said magnetic field responsive transmitting means is a bearing sleeve.

15. A magnetic programming system as in claim 1 and including:
  (a) a plurality of said carriers, and wherein
  (b) said means for moving said carriers includes means for selectively moving said carriers.

16. A magnetic programming system as in claim 15 and wherein:
  (a) said means for selectively moving said carriers includes carrier disengaging clutch means.

17. A magnetic programming system as in claim 1 and wherein:
  (a) said carrier comprises a plurality of abutting belts.

18. A magnetic programming system as in claim 17 and wherein:
  (a) said abutting belts have portions travelling in different planes.

19. A magnetic programming system as in claim 17 and wherein:
  (a) at least one of said abutting belts is of a different length.

20. A magnetic programming system as in claim 1 and wherein:
  (a) said means for inducing polarities includes an elongated magnet, and
  (b) said carrier is wider than the width of said magnet.

21. A magnetic programming system as in claim 20 and wherein:
  (a) said carrier is at least as wide as said magnet is long.

22. A magnetic programming system as in claim 15 and including:
  (a) means for moving said carriers in opposite directions.

23. A magnetic programming system as in claim 1 and wherein:
  (a) one of said magnetic field responsive sensing means includes at least one reed switch member having a plurality of reeds extending radially from a central source.

24. A magnetic programming system as in claim 1 and wherein:
  (a) said means for inducing polarities includes a plurality of magnets, and
  (b) said magnets are shiftable on said carrier in a plane transverse to the longitudinal carrier axis.

25. A magnetic programming system as in claim 1 and wherein:
  (a) said means for inducing polarities includes a plurality of magnets, and
  (b) said magnets are shiftable on said carrier in a plane coincident with the longitudinal carrier axis.

26. A magnetic programming system as in claim 5 and wherein:
  (a) said means for inducing polarities includes a pivoted support and a magnet mounted radially of said pivot on said support.

27. A magnetic programming system as in claim 5 and wherein:
  (a) said means for inducing polarities includes a pivoted support and a pair of magnets mounted radially on either side of said pivot.

28. A magnetic programming system as in claim 27 and wherein:
  (a) said magnets have different directionally oriented polar fields.

29. A magnetic programming system as in claim 26 and wherein:
  (a) said carrier includes a plurality of rows of transmitting means selectively magnetized when said magnet is rotated.

30. A magnetic programming system as in claim 27 and wherein:
  (a) said carrier includes a plurality of rows of transmitting means selectively magnetized when said magnet is rotated.

References Cited

UNITED STATES PATENTS

| 2,770,796 | 11/1956 | Böer | 340—174.1 |
| 3,258,750 | 6/1966 | Shew | 340—174.1 |
| 3,261,941 | 7/1966 | Shlesinger | 335—205 |
| 3,370,278 | 2/1968 | Hendrickx | 340—174.1 |

FOREIGN PATENTS

| 1,169,559 | 5/1964 | Germany. |

BERNARD A. GILHEANY, *Primary Examiner.*

H. BROOME, *Assistant Examiner.*